(12) United States Patent
Sakaguchi et al.

(10) Patent No.: US 11,525,812 B2
(45) Date of Patent: Dec. 13, 2022

(54) GAS CONCENTRATION MEASURING DEVICE AND METHOD OF CALIBRATING SAME

(71) Applicants: UEDA JAPAN RADIO CO., LTD., Ueda (JP); JAPAN RADIO CO., LTD., Mitaka (JP); NISSHINBO HOLDINGS INC., Tokyo (JP)

(72) Inventors: Osamu Sakaguchi, Ueda (JP); Isao Ito, Ueda (JP); Yasuhiro Toriyama, Mitaka (JP); Katsuyuki Matsubayashi, Tokyo (JP)

(73) Assignees: Ueda Japan Radio Co., Ltd., Ueda (JP); Japan Radio Co., Ltd., Mitaka (JP); Nisshinbo Holdings Inc., Tokyo (JP)

( * ) Notice: Subject to any disclaimer, the term of this patent is extended or adjusted under 35 U.S.C. 154(b) by 313 days.

(21) Appl. No.: 16/466,527

(22) PCT Filed: Dec. 18, 2017

(86) PCT No.: PCT/JP2017/045260
§ 371 (c)(1),
(2) Date: Jun. 4, 2019

(87) PCT Pub. No.: WO2018/117007
PCT Pub. Date: Jun. 28, 2018

(65) Prior Publication Data
US 2020/0064311 A1    Feb. 27, 2020

(30) Foreign Application Priority Data
Dec. 21, 2016 (JP) .............................. JP2016-247448

(51) Int. Cl.
*G01N 29/32* (2006.01)
*G01N 29/024* (2006.01)

(52) U.S. Cl.
CPC ......... *G01N 29/326* (2013.01); *G01N 29/024* (2013.01); *G01N 2291/021* (2013.01)

(58) Field of Classification Search
CPC ............... G01N 29/326; G01N 29/024; G01N 2291/021
(Continued)

(56) References Cited

U.S. PATENT DOCUMENTS 5,060,514 A    10/1991    Aylsworth
5,247,826 A    9/1993    Frola et al.
(Continued)

FOREIGN PATENT DOCUMENTS

CN    1455865 A    11/2003
CN    106093192 A    11/2016
(Continued)

OTHER PUBLICATIONS

International Search Report (Including Translation) for International Application No. PCT/JP2017/045260, dated Jan. 30, 2018.
(Continued)

*Primary Examiner* — Lisa M Caputo
*Assistant Examiner* — Rose M Miller
(74) *Attorney, Agent, or Firm* — Jason H. Vick; Sheridan Ross, PC

(57) ABSTRACT

A variable value calculating process includes: measuring a propagation time of the propagation of an ultrasound wave through a measurement sector inside a housing; obtaining a temperature calculated value on the basis of the measured value of the propagation time and a reference distance for the measurement sector; obtaining a temperature measured value by measuring the temperature inside the housing; and obtaining a temperature replacement fluctuation value indicating a difference between the temperature calculated value and the temperature measured value. The variable value
(Continued)

calculating process is executed for each of a plurality of temperature conditions under which the temperature of a reference gas inside the housing differs. A temperature compensation table in which the temperature of a gas to be measured is associated with a temperature compensation value relating to the temperature is obtained on the basis of the temperature replacement fluctuation values obtained under each temperature condition.

9 Claims, 4 Drawing Sheets

(58) Field of Classification Search
USPC .......................................................... 73/597
See application file for complete search history.

(56) References Cited

U.S. PATENT DOCUMENTS

| | | | |
|---|---|---|---|
| 5,313,820 | A | 5/1994 | Aylsworth |
| 5,369,979 | A | 12/1994 | Aylsworth |
| 5,452,621 | A | 9/1995 | Aylsworth |
| 6,279,378 | B1 | 8/2001 | Sheen et al. |
| 2003/0136193 | A1 | 7/2003 | Fujimoto |
| 2004/0060445 | A1 | 4/2004 | Fujimoto |
| 2005/0214603 | A1 | 9/2005 | Barton et al. |
| 2009/0178474 | A1* | 7/2009 | Bailey ............... F02D 41/3809 73/114.38 |
| 2010/0126249 | A1 | 5/2010 | Matsuzaki |
| 2012/0055239 | A1* | 3/2012 | Sinha ...................... G01F 1/74 73/61.79 |
| 2012/0055253 | A1* | 3/2012 | Sinha ................. G01N 29/348 73/622 |
| 2016/0320349 | A1 | 11/2016 | Murphy |

FOREIGN PATENT DOCUMENTS

| | | |
|---|---|---|
| GB | 2257255 A | 1/1993 |
| JP | 03-223669 A | 10/1991 |
| JP | H06-213877 A | 8/1994 |
| JP | H08-233718 A | 9/1996 |
| JP | 2002-214012 A | 7/2002 |
| JP | 2002-214203 A | 7/2002 |
| JP | 2003-135601 | 5/2003 |
| WO | WO 2008/149868 | 12/2008 |

OTHER PUBLICATIONS

Office Action for European Application No. 17885208.3, dated Feb. 11, 2021.
Notice of Reasons for Refusal (Including Translation) for corresponding Japanese Patent Application No. 2016-247448, dated Oct. 13, 2020.
International Preliminary Report on Patentability for International Application No. PCT/JP2017/045260, dated Jul. 4, 2019.
Sonoyama, Masashi et al. "Application of Ultrasonic to a Hydrogen Sensor" IEEE Sensors 2010 Conference; XP031851471; Nov. 1, 2010.
European Search Report for European Application No. 17885208.3, dated Feb. 11, 2020.
Office Action (Including Translation) for corresponding Chinese Patent Application No. 201780078813.4, dated Sep. 29, 2021.

* cited by examiner

GAS CONCENTRATION MEASURING DEVICE AND METHOD OF CALIBRATING SAME

CROSS REFERENCE TO RELATED APPLICATIONS

This application is a National Phase Application under 35 U.S.C. 371 of PCT Application No. PCT/JP2017/045260 having an international filing date of 18 Dec. 2017 which designated the United States, which PCT application claimed the benefit of Japanese Patent Application No. 2016-247448 filed 21 Dec. 2016, each of which are incorporated herein by reference in their entirety.

TECHNICAL FIELD

The present invention relates to a gas concentration measuring apparatus and a method for calibrating the gas concentration measuring apparatus, and more particularly to an apparatus for measuring a concentration of a predetermined gas based on propagation characteristics of ultrasonic waves and a calibration method for the apparatus.

BACKGROUND

Research and development have been broadly conducted on fuel cell vehicles operated with electric power supplied from a fuel cell. The fuel cell generates electric power through a chemical reaction between hydrogen and oxygen. Typically, hydrogen is supplied as a fuel to the fuel cell, and oxygen is extracted from ambient air into the fuel cell. The fuel cell vehicles are equipped with a hydrogen tank, and hydrogen is supplied from the hydrogen tank to the fuel cell. When the amount of hydrogen within the hydrogen tank becomes smaller, hydrogen is supplied from a hydrogen supply device installed in a service station to the hydrogen tank in the fuel cell vehicle.

Because hydrogen is a flammable gas, it is necessary for the fuel cell vehicles and the hydrogen supply devices to be monitored to detect leakage of hydrogen. For this purpose, hydrogen concentration measuring apparatuses have been broadly utilized along with the fuel cell vehicles and the hydrogen supply devices. The hydrogen concentration measuring apparatuses have functions of measuring a concentration of hydrogen contained in air and outputting an alarm when the concentration of hydrogen exceeds a predetermined value.

The below-listed Patent Documents 1 and 2 describe apparatuses for measuring a concentration of a specified gas. The apparatuses described in the patent literature measure the concentration of the specified gas based on propagation characteristics of an ultrasonic wave, such as a propagation velocity of the ultrasonic wave traveling through air to be measured, and may be used for measuring the concentration of hydrogen.

CITATION LIST

Patent Literature

Patent Document 1: JP 2002-214203 A
Patent Document 2: JP H03-223669 A

SUMMARY

Technical Problem

In general, apparatuses for measuring a concentration of a specified gas based on a propagation velocity of an ultrasonic wave include a space where the concentration of the gas is measured. In such a concentration measuring space, ultrasonic transducers for transmitting and receiving an ultrasonic wave are placed. The propagation velocity of the ultrasonic wave is determined based on both a length of time that has elapsed after an ultrasonic transducer for transmission transmits an ultrasonic wave until an ultrasonic transducer for reception receives the ultrasonic wave having passed through the concentration measuring space, and a previously obtained propagation length. The concentration measuring space can, however, expand or contract depending on temperatures as a result of variations in temperature of components disposed around the concentration measuring space or other factors, which causes a measurement value of the propagation velocity obtained using the propagation length determined as a fixed value to include an error, and in turn causes the concentration obtained using the measurement value of the propagation velocity.

An object of the present invention is to improve accuracy in measurement performed by a gas concentration measuring apparatus.

Solution to Problem

The present invention provides a calibration method for calibrating a gas concentration measuring apparatus including a gas concentration measuring space, the method including performing a variation value calculation procedure under each of a plurality of types of temperature conditions in which a reference gas contained in the concentration measuring space has different temperatures, the variation value calculation procedure including a step of measuring a propagation time required for an ultrasonic wave to travel through a measurement track within the concentration measuring space, a step of acquiring a temperature calculation value based on a measured value of the propagation time and a reference length of the measurement track, a step of measuring a temperature in the concentration measuring space to acquire a temperature measurement value, and a step of acquiring a substituted temperature variation value (a substituted value that changes depending on temperatures) indicative of a difference between the temperature calculation value and the temperature measurement value, the method which further includes determining calibration information used for associating a temperature of a gas to be measured with a temperature compensation value for the temperature, based on the substituted temperature variation value acquired under each of the temperature conditions.

It is preferable to previously perform the steps of setting the gas concentration measuring apparatus in a reference state where the reference gas is contained in the concentration measuring space whose internal temperature is set at a reference temperature, measuring a reference propagation time required for the ultrasonic wave to travel through the measurement track while the gas concentration measuring apparatus is in the reference state, and finding a length of the measurement track as the reference length based on the reference propagation time.

Preferably, a gas concentration measuring method for measuring a concentration of a gas using the above-described calibration method includes a step of measuring a temperature in the concentration measuring space to acquire a gas temperature measurement value, a step of measuring a time required for the ultrasonic wave to travel through the measurement track to acquire a propagation time measurement value, a step of correcting the gas temperature measurement value based on the gas temperature measurement value and the calibration information to acquire a compensated temperature measurement value, and a step of measuring a concentration of the gas to be measured, based on the propagation time measurement value, the reference length, and the compensated temperature measurement value.

Further, the present invention provides a gas concentration measuring system equipped with the above-described gas concentration measuring apparatus, in which the gas concentration measuring apparatus preferably uses the above-described gas concentration measuring method to measure the concentration of the gas to be measured.

The present invention is characterized by including a concentration measuring space where a gas concentration is measured, a transmitter unit which transmits an ultrasonic wave into the concentration measuring space, a receiver unit which receives the ultrasonic wave having traveled through the concentration measuring space, a propagation time measuring unit which measures a propagation time that has elapsed between transmission of the ultrasonic wave from the transmitter unit and reception, in the receiver unit, of the ultrasonic wave having traveled through a measurement track within the concentration measuring space to acquire a propagation time measurement value, a temperature measuring unit which measures a temperature in the concentration measuring space to acquire a gas temperature measurement value, and a calculator unit which acquires a concentration of a gas to be measured, based on the propagation time measurement value, a reference length of the measurement track, and the gas temperature measurement value, in which the calculator unit uses previously determined calibration information for correcting the gas temperature measurement value to acquire a compensated temperature measurement value, and determines, based on the compensated temperature measurement value, the concentration of the gas to be measured, the calibration information being information used for associating the gas temperature measurement value with a temperature compensation value which includes a value of a temperature substituted for at least one of variations consisting of a variation of the length of the measurement track in response to a change in temperature of the concentration measuring space, a variation of the propagation time measurement value in response to a change in temperature of the transmitter unit, and a variation of the propagation time measurement value in response to a change in temperature of the receiver unit. In the above configuration, the calculator unit acquires the compensated temperature measurement value based on the temperature compensation value associated with the gas temperature measurement value.

Preferably, the calibration information is determined through a calibration information acquisition process that includes performing a variation value calculation procedure under each of a plurality of types of temperature conditions in which a reference gas contained in the concentration measuring space has different temperatures, the variation value calculation procedure including a step of acquiring, in the propagation time measuring unit, a propagation time required for the ultrasonic wave to travel through the measurement track, a step of acquiring, in the calculator unit or an external calculation device installed separately from the gas concentration measuring apparatus, the temperature calculation value based on both a measured value of the propagation time and the reference length, a step of measuring, in the temperature measuring unit, the temperature in the concentration measuring space to acquire a temperature measurement value, and a step of acquiring, in the calculator unit or the external calculation device, a substituted temperature variation value indicative of a difference between the temperature calculation value and the temperature measurement value, the calibration information acquiring process further including determining, in the calculator unit or the external calculation apparatus, the calibration information used for associating a temperature of a gas contained in the concentration measuring space with a temperature compensation value, based on the substituted temperature variation value acquired under each of the temperature conditions.

In addition, the present invention is characterized by including a concentration measuring space where a gas concentration is measured, a propagation time measuring unit that measures, based on transmission and reception of an ultrasonic wave, a propagation time required for an ultrasonic wave to travel through a measurement track within the concentration measuring space to acquire a propagation time measurement value, a temperature measuring unit that measures the temperature in the concentration measuring space to acquire a gas temperature measurement value, and a calculator unit that acquires a concentration of a gas to be measured based on the propagation time measurement value, a reference length of the measurement track, and the gas temperature measurement value, the calculator unit correcting the gas temperature measurement value using predetermined calibration information to acquire a compensated temperature measurement value, and determining the concentration of the gas to be measured based on the compensated temperature measurement value. In this configuration, the calibration information is determined through a calibration information acquiring process that includes performing a variation value calculation procedure under each of a plurality of types of temperature conditions in which a reference gas contained in the concentration measuring space has different temperatures, the variation value calculation procedure including a step of acquiring, in the propagation time measuring unit, the propagation time required for the ultrasonic wave to travel through the measurement track, a step of acquiring, in the calculator unit or an external calculation device installed separately from the gas concentration measuring apparatus, a temperature calculation value based on the propagation time measurement value and the reference length, a step of measuring, in the temperature measuring unit, the temperature in the concentration measuring space to acquire the temperature measurement value, and a step of acquiring, in the calculator unit or the external calculation device, a substituted temperature variation value indicative of a difference between the temperature calculation value and the temperature measurement value, and the calibration information acquiring process further includes acquiring, in the calculator unit or the external calculation device, the calibration information used for associating the temperature of the gas in the concentration measuring space with a temperature compensation value, based on the substituted temperature variation value acquired under each of the temperature conditions.

It is preferable, before performing the calibration information acquiring process, to measure, in the propagation time measuring unit, a reference propagation time required for the ultrasonic wave to travel through the measurement track when the reference gas is contained in the concentration measuring space which is set at the reference temperature, and acquire, in the calculator unit or the external calculation device, a length of the measurement track as the reference length based on the reference propagation time.

Advantageous Effects of Invention

According to the present invention, it becomes possible to improve the accuracy in measurement performed by the gas concentration measuring apparatus.

Figure 1:
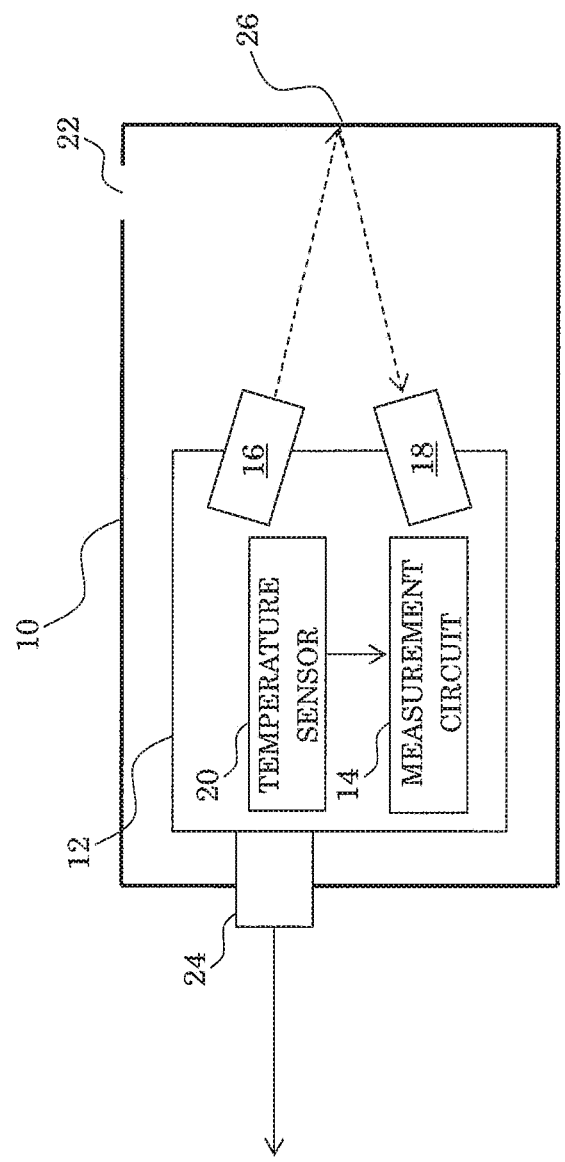
FIG. 1 is a diagram schematically showing a gas concentration measuring apparatus.

DESCRIPTION OF EMBODIMENTS (1) Configuration Overview of Gas Concentration Measuring Apparatus FIG. 1 schematically shows a gas concentration measuring apparatus according to an embodiment of this invention. The gas concentration measuring apparatus has a casing 10 including a concentration measuring space where a gas concentration is measured, and measures the gas concentration based on a propagation velocity of an ultrasonic wave propagating through a gas within the casing 10. The casing 10 has a ventilation hole 22 through which a gas flows in or out of the housing 10. It should be noted that the shape of the concentration measuring space inside the housing 10 is, for example, a box shape, a cylindrical shape, or the like. The concentration measuring space is not necessarily enclosed in all directions by walls of the housing 10, and may be any space through which at least an ultrasonic wave can be transmitted and received. For example, the casing 10 may be partially lost to define a lost part where the concentration measuring space is open to the outside. However, when the structure is implemented as shown in FIG. 1 in which the concentration measuring space is enclosed by the walls of the housing 10 and the ventilation hole 22 is provided, the gas to be measured can be introduced into the housing 10 in a stable state irrespective of indoor or outdoor use of the gas concentration measuring apparatus, which can often lead to improved reliability, stability, and other properties in measurement.

The gas concentration measuring apparatus includes a circuit board 12 housed in the housing 10. The circuit board 12 is equipped with a measurement circuit 14, a transmission transducer 16, a reception transducer 18, a temperature sensor 20, and a connector 24. The transmission transducer 16 transmits an ultrasonic wave based on operation of the measurement circuit 14. The reception transducer 18 receives the ultrasonic wave transmitted from the transmission transducer 16 and reflected from a reflector plate disposed on the inside of the housing 10. The measurement circuit 14 finds a propagation velocity of the ultrasonic wave based on a time elapsed between transmission and reception of the ultrasonic wave and a previously obtained propagation length of the ultrasonic wave. The measurement circuit 14 measures a temperature in the casing 10 from a value detected by the temperature sensor 20, finds a below-described compensated temperature measurement value, and acquires a gas concentration based on the propagation velocity of the ultrasonic wave and the compensated temperature measurement value. A specific process to acquire the gas concentration in the measurement circuit 14 will be described below. The measurement circuit 14 outputs a gas concentration measurement value to a computer, a display, or the like connected to the connector 24 as an external device.

(2) Specific Configuration of Gas Concentration Measuring Apparatus

Figure 2:
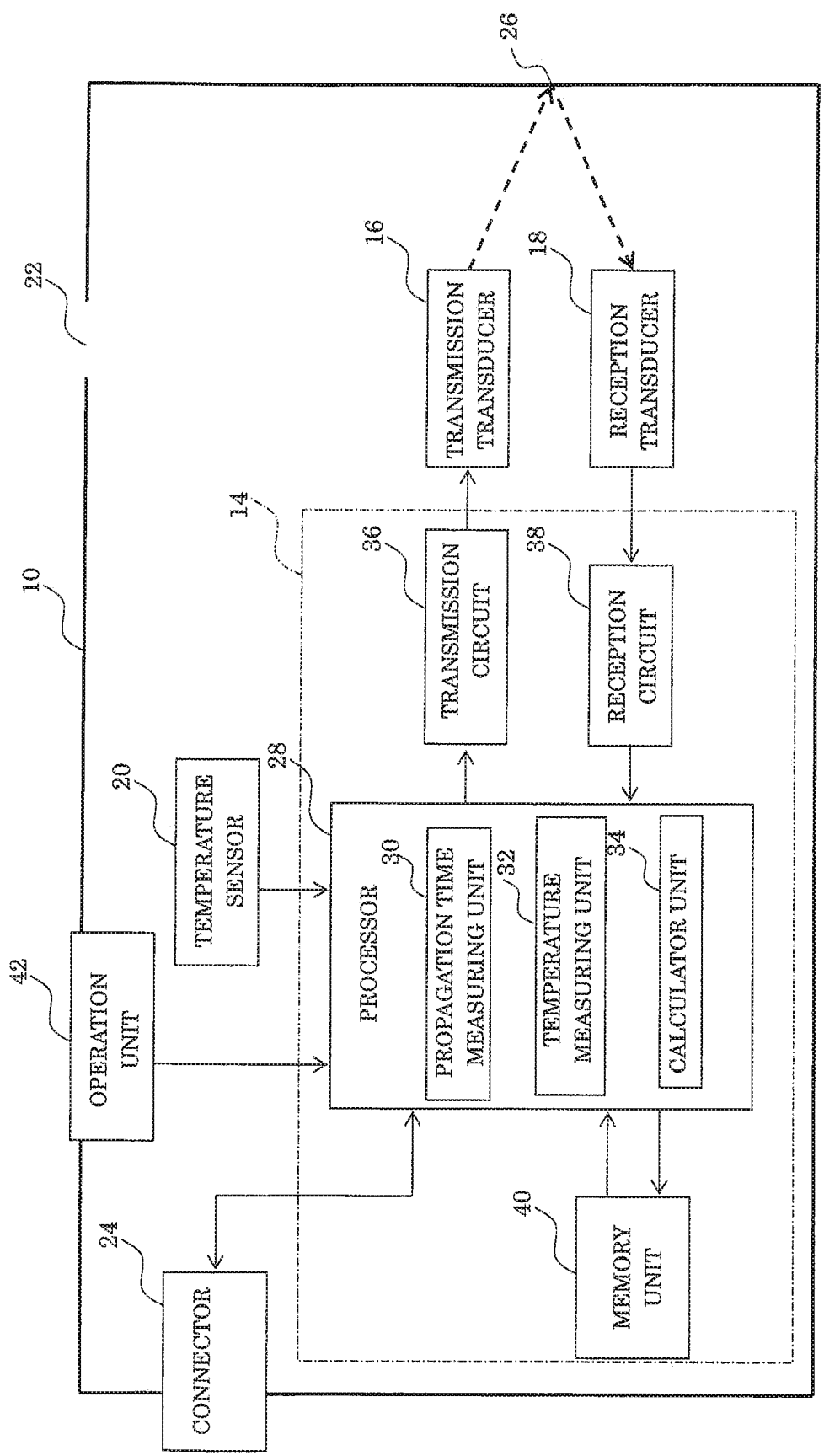
FIG. 2 is a diagram showing a detailed configuration of the gas concentration measuring apparatus.

FIG. 2 shows a detailed configuration of the gas concentration measuring apparatus according to an embodiment of the present invention. The gas concentration measuring apparatus includes the housing 10, the transmission transducer 16, the reception transducer 18, the measurement circuit 14, the temperature sensor 20, the connector 24, and an operation unit 42. The measurement circuit 14 includes a transmission circuit 36, a reception circuit 38, a processor 28, and a memory unit 40. The transmission transducer 16, the reception transducer 18, the temperature sensor 20, the connector 24, and the operation unit 42 are connected to the measurement circuit 14.

The processor 28 executes a program stored in the memory unit 40 or a program previously stored in the processor 28 itself, to internally configure a propagation time measuring unit 30, a temperature measuring unit 32, and a calculator unit 34. These components may be separately configured by digital hardware circuits rather than being implemented by the processor 28.

A process of measuring a hydrogen concentration with the gas concentration measuring apparatus will be described. The transmission circuit 36 and the transmission transducer 16 operate as a transmitter unit which transmits an ultrasonic wave. The transmission circuit 36 outputs a transmission pulse signal to the transmission transducer 16 in accordance with control by the propagation time measuring unit 30. The transmission transducer 16 converts the transmission pulse signal, which is an electric signal, into an ultrasonic wave and transmits a transmission ultrasonic pulse. The transmission ultrasonic pulse is reflected from the reflector plate disposed on the inside of the housing 10. The reception transducer 18 and the reception circuit 38 operate as a receiver unit which receives the ultrasonic wave. The reception transducer 18 receives the ultrasonic wave reflected from the reflector plate disposed on the inside of the housing 10, and converts the received ultrasonic wave into a reception pulse signal, which is an electric signal, and outputs the converted reception pulse signal to the reception circuit 38. The reception circuit 38 adjusts a level of the reception pulse signal and outputs the adjusted reception pulse signal to the propagation time measuring unit 30. The propagation time measuring unit 30 acquires a propagation time t that has elapsed between output of the transmission pulse signal from the transmission circuit 36 and output of the reception pulse signal from the reception circuit 38.

The memory unit 40 stores a reference length d0. The reference length d0 is a reference value previously obtained by measuring the length of a measurement track that extends from the transmission transducer 16 to a reflection point 26 on the reflector plate disposed on the inside of the housing 10 and further extends from the reflection point 26 to the reception transducer 18. The calculator unit 34 reads the reference length d0 from the memory unit 40 and divides the reference length d0 by the propagation time t to acquire a propagation velocity measurement value vm.

Further, the temperature measuring unit 32 determines a temperature measurement value Tm based on a detection value from the temperature sensor 20.

The memory unit 40 stores a temperature compensation table containing the temperature measurement values Tm associated with temperature compensation values Δ. The temperature compensation values Δ are values that collectively compensate for below-listed variations in values other than 0 caused in response to a change in ambient temperature, and may be used for compensating for at least one of the below-listed variations in values. The variations to be compensated for include a variation of a measurement error in the temperature measurement value Tm, a variation of the length of the measurement track resulting from expansion and contraction of the housing 10, a variation of a transmission response time elapsed from input of the transmission pulse signal into the transmission transducer 16 until transmission of the transmission ultrasonic pulse, a variation of a reception response time elapsed from reception of the reception ultrasonic pulse at the reception transducer 18 and output of the ultrasonic pulse signal from the reception transducer 18, etc. A calibration process of acquiring the temperature compensation table will be described below. It should be noted that a temperature compensation coefficient may be stored in place of the temperature compensation table.

The calculator unit 34 accesses the temperature compensation table stored in the memory unit 40 to acquire the temperature compensation value Δ associated with the temperature measurement value Tm. Then, the calculator unit 34 adds the temperature compensation value Δ to the temperature measurement value Tm to acquire a compensated temperature measurement value Tc=Tm+Δ. The calculator unit 34 determines a hydrogen concentration p based on Equation 1 as follows:

$$p = \frac{1}{M_h - M_a}(kTc/v_m^2 - M_a) \quad \text{[Equation 1]}$$

Where k represents a specific heat ratio of a gas, R represents a gas constant, Mh represents a molecular weight of hydrogen, and Ma represents a molecular weight of air that is free of hydrogen. Assuming that the composition of air to be measured consists only of 80% nitrogen and 20% oxygen, the specific heat ratio k may be specified as 1.4. Further, the gas constant R is 8.31, the molecular weight Mh of hydrogen is 2.0, and the molecular weight Ma of air is 28.8. As described above, the propagation velocity measurement vm and the compensated temperature measurement Tc are determined by the calculator unit 34.

Because each value on the right side of Equation 1 is known, the calculator unit 34 can determine the hydrogen concentration p from Equation 1. The processor 28 outputs the thus-obtained hydrogen concentration p from the connector 24 to an external computer. When the gas concentration measuring apparatus includes a display panel, the processor 28 may display the obtained hydrogen concentration p on the display panel.

Equation 1 is derived as described below. In general, the molecular weight M, the specific heat ratio k of a gas, the gas constant R, a temperature T of the gas, and a sonic velocity v can be expressed by Equation 2 as follows:

$$M = \frac{kRT}{v^2} \quad \text{[Equation 2]}$$

Assuming that hydrogen is contained in air at a concentration p, Equation 3 holds for each molecular weight.

$$M = pM_h + (1-p)M_a \quad \text{[Equation 3]}$$

Equation 1 can be obtained by solving Equation 3 for the concentration p, substituting Equation 2 for the molecular weight M to delete the molecular weight M, replacing the sonic velocity v with the propagation velocity measurement value vm, and replacing the temperature T of the gas with the compensated temperature measurement Tc.

(3) Calibration Process

In a calibration process, the above-described temperature compensation table is determined. According to an embodiment described below, the processor 28 carries out the calibration process in response to operation of the operation unit 42 by a user. However, the calibration process may be performed in whole or in part by the external computer connected to the connector 24. In other words, the external computer may carry out the whole or a part of the process performed by the processor 28 in the following description.

(i) Measurement in Reference State (Process of Finding Reference Length d0)

The user initially establishes a reference state of the gas concentration measuring apparatus placed in a reference environment. Here, the reference environment refers to, for example, an environment which has a temperature set at a reference temperature T0=293K (+20° C.) and which is surrounded by air prepared as a reference gas containing nitrogen at a concentration of approximately 80% and oxygen at a concentration of approximately 20%. In the reference state, the reference gas enters the casing 10 of the gas concentration measuring apparatus, and remains contained in the casing 10.

The propagation time measuring unit 30 controls the transmission circuit 36 and the reception circuit 38 to transmit a transmission ultrasonic pulse from the transmission transducer 16 and receive a reception ultrasonic pulse in the reception transducer 18. The propagation time measuring unit 30 acquires, as a reference propagation time t0, a time between output of a transmission pulse signal from the transmission circuit 36 and output of a reception pulse signal from the reception circuit 38. The reference propagation time t0 is a time required for the ultrasonic wave to travel through a measurement track while the gas concentration measuring apparatus is in the reference state, the measurement track ranging from the transmission transducer 16 to the reflection point 26 on the reflector plate inside the casing 10 and further ranging from the reflection point 26 to the reception transducer 18.

The calculator unit 34 calculates a reference propagation velocity v0 which is a propagation velocity of the ultrasonic wave in the reference state. The reference propagation velocity v0 may be previously stored in the calculator unit 34 through user operation. The reference propagation velocity v0 is a value determined in accordance with Equation 4 obtained by rearranging Equation 2. In other words, the reference propagation velocity v0 is a propagation velocity acquired by substituting the reference temperature T0 for the temperature T of the gas and substituting the molecular weight Ma of the reference gas for the molecular weight M in Equation 4.

$$v = \sqrt{\frac{kRT}{M}} \qquad \text{[Equation 4]}$$

The calculator unit 34 multiplies the reference propagation velocity v0 by the reference propagation time t0 to find a length of the measurement track ranging from the transmission transducer 16 to the reflection point 26 on the reflector panel inside the casing 10 and further ranging from the reflection point 26 to the reception transducer 18, and stores the found length as a reference length d0 in the memory unit 40.

Thus, in a first stage of the calibration process, the following steps are performed, including a step of establishing the gas concentration measuring apparatus in the reference state where the reference gas is contained in the casing 10 functioning as a space for measuring a gas concentration and the inside of the casing 10 is set at the reference temperature, a step of measuring the reference propagation time t0 required for the ultrasonic wave to travel through the measurement track inside the casing 10 while the gas concentration measuring apparatus is in the reference state, and a step of acquiring the length of the measurement track as the reference distance d0 based on the reference propagation time t0.

(ii) Measurement Under Varying Temperatures

The user places the gas concentration measuring apparatus in a plurality of environments having different temperatures. The calculator unit 34 finds the propagation time required for the ultrasonic wave to travel through the entire measurement track under each of the environments. For example, while the temperature is changed in units of 5K between 253K and 323K for environmental temperature Te, the propagation time for traveling through the measurement track is acquired for each of the environmental temperatures Te through the same process steps as those performed in the above-described reference state. In this example, the calculator unit 34 acquires, in each of 16 types of temperature environments Te=253K, 258K, 263K, . . . 318K, and 323K, the propagation time t(Te)=t(253) t(258), t(263), . . . , t(318), and t(323) where numeral values inside the parentheses represent the environmental temperatures Te.

Further, the temperature measuring unit 32 determines the temperature measurement values Tm(Te)=Tm(253), Tm(258), Tm(263), . . . , Tm(318), and Tm(323) based on a detection value obtained from the temperature sensor 20 for each of the environments.

The calculator unit 34 determines a propagation velocity calculation value v(Te) associated with the propagation time t(Te) acquired for each of the environmental temperatures Te. Specifically, the calculator unit 34 divides the reference length d0 stored in the memory unit 40 by the propagation time t(Te) to determine the propagation velocity calculation value v(Te).

The calculator unit 34 acquires a temperature calculation value Tcal(Te) for each of the environmental temperatures Te based on Equation 5.

$$T_{cal}(T_e) = \frac{v(T_e)^2 M_a}{kR} \qquad \text{[Equation 5]}$$

Equation 5 is a mathematical expression obtained by solving Equation 2 for the temperature T of the gas, substituting the propagation velocity calculation value v(Te) for the sonic velocity v, and substituting the molecular weight Ma of the reference gas for the molecular weight M of the gas.

The calculator unit 34 subtracts the temperature measurement value Tm(Te) acquired in each environment from the temperature calculation value Tcal(Te) acquired for each of the environmental temperatures Te, to find a substituted temperature variation value δ(Te) for each of the environmental temperatures Te. That is, the calculator unit 34 finds the substituted temperature variation value δ(Te) in accordance with Equation 6.

$$\delta(T_e) = T_{cal}(T_e) - T_m(T_e) \qquad \text{[Equation 6]}$$

The temperature calculation value Tcal(Te) includes, in addition to a true value of the environmental temperature, a value δ1 of a temperature substituted for a variation of the propagation velocity calculation value v(Te) with reference to a change in the environmental temperature. The variation of the propagation velocity calculation value v(Te) includes variations associated with expansion and contraction of the measurement track, a change in transmission response time, and a change in reception response time in response to a change of the environmental temperature Te from the reference temperature T0. Therefore, it can be said that the temperature calculation value Tcal(Te) contains a value δ1 (hereinafter referred to as a structural variation value δ1) of the temperature substituted for the variations resulting from the change of the environmental temperature Te from the reference temperature T0.

On the other hand, the temperature measurement value Tm(Te) includes, in addition to the true value of the environmental temperature, a measurement error δ2 associated with a detection error in the temperature sensor 20. In this regard, the substituted temperature variation value δ(Te) may be regarded as a value of the sum of the structural variation value δ1 and the measurement error δ2 in the temperature sensor 20. That is, the following Equation 7 is established.

$$\delta(T_e) = \delta 1 + \delta 2 \qquad \text{[Equation 7]}$$

Thus, in a second stage of the calibration process, a below-described variation value calculation procedure is carried out for each of temperature conditions where the referent gas in the casing 10 has different temperatures. More specifically, the variation value calculation procedure includes a step of measuring the propagation time required for the ultrasonic wave to travel through the measurement track, a step of acquiring the temperature calculation value based on both the measurement value of the propagation time and the reference distance, a step of measuring the temperature in the casing 10 to acquire the temperature measurement value, and a step of acquiring the substituted temperature variation value indicative of a difference between the temperature calculation value and the temperature measurement value.

(iii) Creation of Temperature Compensation Table

The calculator unit 34 may determine, based on the substituted temperature variation value δ(Te) discretely acquired for each of the environmental temperatures Te, a δ(T) function which can yield the substituted temperature variation value δ(Te) with respect to a continuous value of the environmental temperature Te. This process is implemented, for example, by approximating a relationship between each of the environmental temperatures Te and the substituted temperature variation value δ(Te) to a linear function or a quadratic or higher-order function. The δ(T) function may be a group of individual functions defined for each of temperature ranges divided by a predetermined range. The calculator unit 34 creates a temperature compensation table in which the relationship between the environmental temperature Te and the substituted temperature variation value δ(Te) is replaced with a relationship between the temperature measurement value Tm and temperature compensation value Δ. The calculator unit 34 stores the temperature compensation table as calibration information in the memory unit 40.

Figure 3:
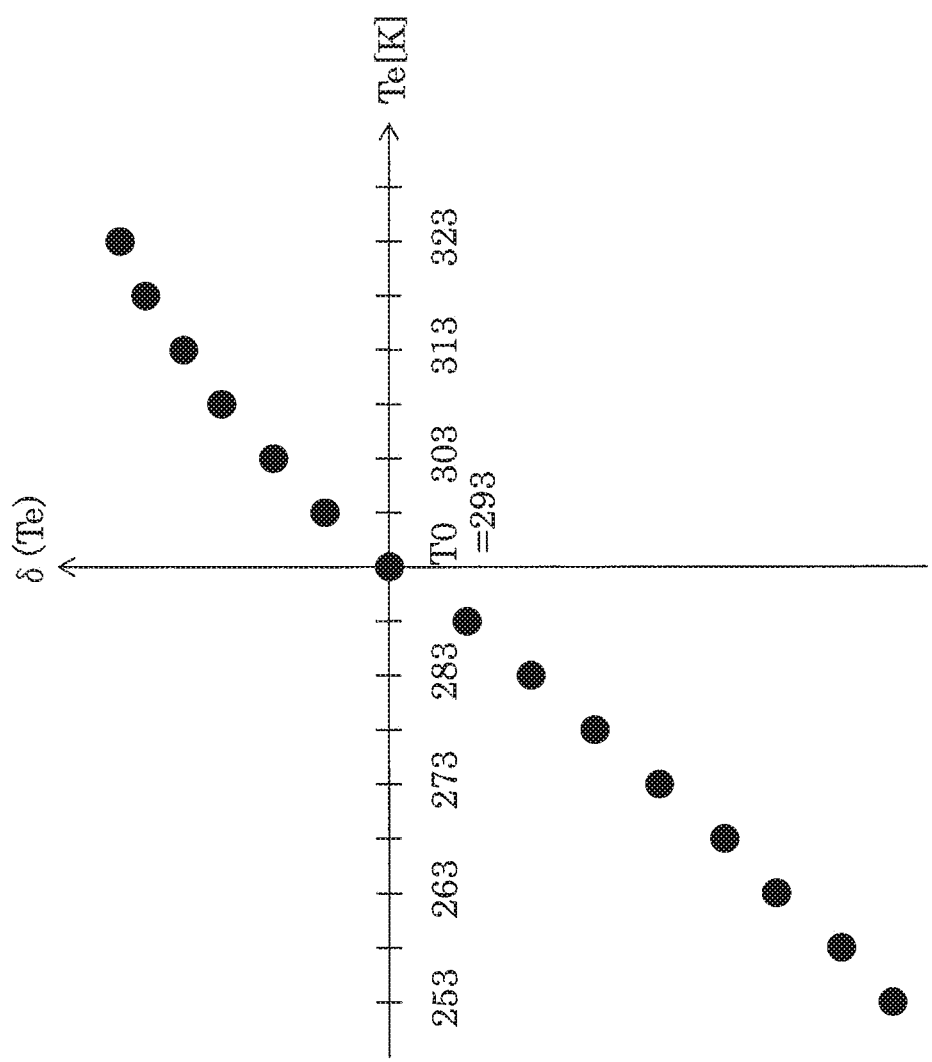
FIG. 3 is a diagram showing an example of substituted temperature variation values discretely obtained for each of environmental temperatures.

FIG. 3 shows in the form of a graph an example of the substituted temperature variation values δ(Te) discretely obtained for each of the environmental temperatures Te. The abscissa represents the environmental temperatures Te and the ordinate represents the substituted temperature valuation values δ(Te). The calculator unit 34 may find the δ(T) function that connects solid circles representing each relationship between the environmental temperatures Te and the substituted temperature variation values δ(Te), and create, based on the found δ(T) function, the temperature compensation table.

The calculator unit 34 may create the temperature compensation table using the substituted temperature variation value δ(Te) acquired for each of the environmental temperatures Te, without being changed, as the temperature compensation value Δ corresponding to each temperature measurement value Tm. In this case, the substituted temperature variation value δ(Te) may be acquired for each of the environmental temperatures Te in units of increments or decrements smaller than 5K.

In a case of mass production of the gas concentration measuring apparatuses, a temperature compensation table determined for a particular one of the gas concentration measuring apparatuses may be stored in the memory units of the other gas concentration measuring apparatuses to be mass-produced, or a temperature compensation table may be determined for each of the gas concentration measuring apparatuses and independently stored in each of the memory units of the gas concentration measuring apparatuses.

Further, rather than creating the temperature compensation table as calibration information used for associating the temperatures of the gas with the temperature compensation values, a calibration function may be determined, the calibration function yielding the temperature compensation value from a specified temperature of the gas. In this case, each coefficient in an nth-order polynominal expression that defines the δ(T) function may be acquired as calibration information. That is, each coefficient $c_i$ may be acquired in Equation 8 as the calibration information.

$$\delta(T) = \sum_{i=o}^{i=n} c_i T^i \quad \text{[Equation 8]}$$

(4) Measurement of Hydrogen Concentration

In measurement of a hydrogen concentration, the temperature measuring unit 32 acquires the temperature measurement value Tm based on the detection value from the temperature sensor 20. The calculator unit 34 refers to the temperature compensation table stored in the memory unit 40 to acquire the temperature compensation value Δ corresponding to the temperature measurement value Tm. Then, the calculator unit 34 adds the temperature compensation value Δ to the temperature measurement value Tm to acquire the compensated temperature measurement value Tc. The compensated temperature measurement value Tc is expressed as shown in Equation 9. The calculator unit 34 determines a hydrogen concentration p based on above-described Equation 1.

$$T_c = T_m + \Delta \quad \text{[Equation 9]}$$

The temperature compensation value Δ is expressed as Δ=δ1+δ2 using the structural variation value δ1 and the measurement error δ2 in the temperature sensor 20. In addition, taking the true value of the temperature as Ta, the temperature measurement value Tm is expressed as Tm=Ta−δ2. Accordingly, the compensated temperature measurement value Tc is expressed as Tc=Tm−Δ=Ta−δ2+(δ1+δ2)=Ta+δ1 in which the measurement error δ2 in the temperature sensor 20 is cancelled, and the structural variation value δ1 is reflected in the compensated temperature measurement value Tc. In this way, the compensated temperature measurement value Tc is obtained as a value in which expansion and contraction of the measurement track, the change of the transmission response time, the change of the reception response time, and other changes resulting from the change in the temperature of the gas from the reference temperature T0 are compensated for by the structural variation value δ1, and the measurement error δ2 in the temperature sensor 20 is suppressed. The use of the compensated temperature measurement value Tc can lead to acquisition of the hydrogen concentration p for which factors of the above-described variations and changes have been compensated.

(5) Modification Example

The calculator unit 34 may divide the temperature calculation value Tcal(Te) acquired for each of the environmental temperature values Te by the temperature measurement value Tm(Te) acquired in each of the temperature environments, to determine the substituted temperature variation value δ(Te) for each of the environmental temperatures. More specifically, the calculator unit 34 finds a relationship between the environmental temperature Te and the substituted temperature variation value δ(Te) based on Equation 10, and determines, from the found relationship, a relationship between the temperature measurement value Tm and the temperature compensation value Δ, to create the temperature compensation table.

$$\delta(T_e) = T_{cal}(T_e)/T_m(T_e) \quad \text{[Equation 10]}$$

In this case, the calculator unit 34 refers to the temperature compensation table stored in the memory unit 40 to acquire the temperature compensation value Δ corresponding to the temperature measurement value Tm. Then, the calculator unit 34 multiplies the temperature measurement value Tm by the acquired temperature compensation value Δ to find the compensated temperature measurement value Tc=Tm×Δ. The calculator unit 34 determines the hydrogen concentration p based on above-described Equation 1.

It should be noted that although the structure in which the transmission transducer 16 and the reception transducer 18 are separately arranged has been described in the above, a common transducer may be shared as both ultrasonic transducers. Specifically, the structure may be implemented with a single common ultrasonic transducer connected to both the transmission circuit 36 and the reception circuit 38, and the common ultrasonic transducer may perform both transmission and reception of the ultrasonic pulse.

Figure 4:
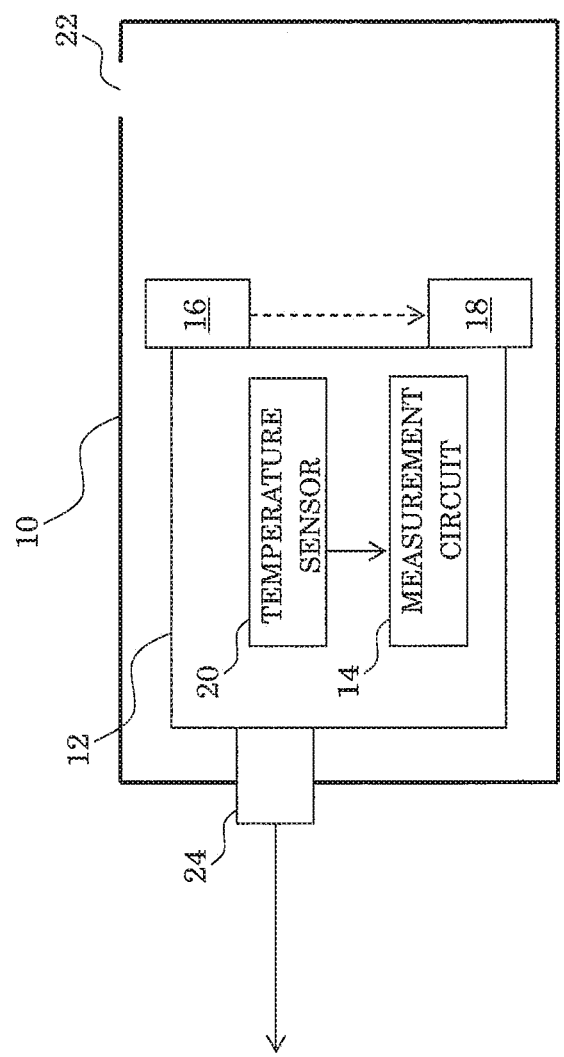
FIG. 4 is a diagram showing a modification example of the gas concentration measuring apparatus.

Further, in the above, the structure has been explained in which the ultrasonic wave is transmitted from the transmission transducer 16 toward the reflector plate inside the casing 10, and the ultrasonic wave reflected from the reflector plate inside the casing 10 is received by the reception transducer 18. Other than this structure, a structure incorporating the transmission transducer 16 and the reception transducer 18 opposed to each other as shown in FIG. 4 may be employed. In this case, the ultrasonic wave transmitted from the transmission transducer 16 travels through the casing 10 until it is directly received by the reception transducer 18. A path that directly connects the transmission transducer 16 and the reception transducer 18 is defined as the measurement track.

In addition, in the measurement of the hydrogen concentration p, Equation 11 obtained by adding a correction term f to Equation 1 may be used in place of Equation 1. The correction term f may be a function of the compensated temperature measurement value Tc. Because the correction term f is sufficiently small relative to the first term on the right side of the equation, the compensated temperature measurement value Tc as defined in the above description may be used. Further, based on the fact that the correction term f is sufficiently small relative to the first term on the right side of the equation, the same calibration process as that performed using Equation 1 may be carried out even in a case where the hydrogen concentration p is determined using Equation 11.

$$p = \frac{1}{M_h - M_a}(kRTc/v_{m^2} - M_a) + f \quad \text{[Equation 11]}$$

In the above description, the gas concentration measuring apparatus has been explained in accordance with the embodiment in which the concentration of hydrogen is measured. The gas concentration measuring apparatus may be used for measuring the concentration of other gases. In this case, values of the specific heat ratio k, the number of molecules, and other features are replaced with those defined for the gas to be measured, and the process is carried out using the replaced values.

REFERENCE SIGNS LIST 10 casing, 12 circuit board, 14 measurement circuit, 16 transmission transducer, 18 reception transducer, 20 temperature sensor, 22 ventilation hole, 24 connector, 26 reflection point, 28 processor, 30 propagation time measuring unit, 32 temperature measuring unit, 34 calculator unit, 36 transmission circuit, 38 reception circuit.

The invention claimed is:

1. A method for an apparatus including a gas concentration measuring space, the method comprising:
performing a variation value calculation procedure under each of a plurality of types of temperature conditions in which a reference gas contained in the concentration measuring space has different temperatures, the variation value calculation procedure comprising:
measuring a propagation time required for an ultrasonic wave to travel through a measurement track within the concentration measuring space;
acquiring a temperature calculation value based on a measurement value of the propagation time and a reference length of the measurement track;
measuring a temperature in the concentration measuring space to acquire a temperature measurement value; and
acquiring a substituted temperature variation value indicative of a difference between the temperature calculation value and the temperature measurement value; and
determining calibration information used for associating a temperature of a sample gas to be measured with a temperature compensation value for the temperature, based on the substituted temperature variation value acquired under each of the temperature conditions.

2. The method according to claim 1, further comprising:
setting the apparatus in a reference state where the reference gas is contained in the concentration measuring space whose internal temperature is set at a reference temperature;
measuring a reference propagation time required for the ultrasonic wave to travel through the measurement track when the apparatus is in the reference state; and
acquiring, as the reference length, a length of the measurement track based on the reference propagation time.

3. The method according to claim 2, further comprising:
measuring a temperature in the concentration measuring space to acquire a gas temperature measurement value;
measuring a time required for the ultrasonic wave to travel through the measurement track, to acquire a propagation time measurement value;
correcting the gas temperature measurement value based on the gas temperature measurement value and the calibration information to acquire a compensated temperature measurement value; and
measuring a concentration of the sample gas based on the propagation time measurement value, the reference length, and the compensated temperature measurement value.

4. The method according to claim 1, further comprising:
measuring a temperature in the concentration measuring space to acquire a gas temperature measurement value;
measuring a time required for the ultrasonic wave to travel through the measurement track, to acquire a propagation time measurement value;
correcting the gas temperature measurement value based on the gas temperature measurement value and the calibration information to acquire a compensated temperature measurement value; and
measuring a concentration of the sample gas, based on the propagation time measurement value, the reference length, and the compensated temperature measurement value.

5. A gas concentration measuring apparatus, comprising:
a concentration measuring space where a gas concentration is measured;
a transmitter that transmits an ultrasonic wave into the concentration measuring space;
a receiver that receives the ultrasonic wave having traveled through the concentration measuring space;
processing circuitry that:
measures a propagation time that has elapsed between transmission of the ultrasonic wave from the transmitter and reception in the receiver, of the ultrasonic wave having traveled through a measurement track within the concentration measuring space, to acquire a propagation time measurement value;
determines, based on output of a temperature sensor, a temperature in the concentration measuring space to acquire a gas temperature measurement value; and
acquires a concentration of a sample gas based on the propagation time measurement value, a reference length of the measurement track, and the gas temperature measurement value; wherein the processing circuitry corrects the gas temperature measurement value using predetermined calibration information to acquire a compensated temperature measurement value, and acquires, based on the compensated temperature measurement value, a concentration of the sample gas, the calibration information is information used for associating the gas temperature measurement value with a temperature compensation value, the temperature compensation value includes a value that compensates for at least one of a variation in length of the measurement track in response to a change in temperature of the concentration measuring space, a variation in the propagation time measurement value in response to a change in temperature of the transmitter, or a variation in the propagation time measurement value in response to a change in temperature of the receiver, and the processing circuitry acquires the compensated temperature measurement value based on the temperature compensation value associated with the gas temperature measurement value, wherein the calibration information is determined through a calibration information acquiring process, the calibration information acquiring process comprising:

performing a variation value calculation procedure under each of a plurality of types of temperature conditions in which a reference gas contained in the concentration measuring space has different temperatures, the variation value calculation procedure comprising:

acquiring, by the processing circuitry, a propagation time required for the ultrasonic wave to travel through the measurement track; and acquiring, by the processing circuitry or an external calculation device installed separately from the gas concentration measuring apparatus, a temperature calculation value based on the propagation time measurement value and the reference length, wherein the calibration information acquiring process further comprises:

determining, based on output of a temperature sensor, a temperature in the concentration measuring space to acquire a temperature measurement value; and acquiring, by the processing circuitry or the external calculation device, a substituted temperature variation value indicative of a difference between the temperature calculation value and the temperature measurement value.

6. The gas concentration measuring apparatus according to claim 5, wherein the calibration information acquiring process further comprises:

acquiring, by the processing circuitry or the external calculation device, the calibration information used for associating a temperature of the sample gas contained in the concentration measuring space with a temperature compensation value, based on the substituted temperature variation value acquired under each of the temperature conditions.

7. The gas concentration measuring apparatus according to claim 6, wherein:

prior to performing the calibration information acquiring process, a procedure is performed, the procedure comprising:

measuring, by the processing circuitry, a reference propagation time required for the ultrasonic wave to travel through the measurement track when the reference gas is contained in the concentration measuring space having an internal temperature set at a reference temperature, and acquiring, by the processing circuitry or the external calculation device, a length of the measurement track as the reference length based on the reference propagation time.

8. A gas concentration measuring apparatus, comprising:
a concentration measuring space where a gas concentration is measured;
at least one processor that:
measures, based on transmission and reception of an ultrasonic wave, a propagation time required for the ultrasonic wave to travel through a measurement track in the concentration measuring space to acquire a propagation time measurement value;
determines, based on output of a temperature sensor, a temperature in the concentration measuring space to acquire a gas temperature measurement value; and
acquires a concentration of a sample gas based on the propagation time measurement value, a reference length of the measurement track, and the gas temperature measurement value; wherein
the at least one processor corrects the gas temperature measurement value using previously determined calibration information to acquire a compensated temperature measurement value, and acquires, based on the compensated temperature measurement value, a concentration of the sample gas, and
the calibration information is determined by a calibration information acquiring process comprising:
performing a variation value calculation procedure under each of a plurality of types of temperature conditions in which a reference gas contained in the concentration measuring space has different temperatures, the variation value calculation procedure comprising:
acquiring, by the at least one processor, a propagation time required for the ultrasonic wave to travel through the measurement track,
acquiring, by the at least one processor or an external calculation device installed separately from the gas concentration measuring apparatus, a temperature calculation value based on the propagation time measurement value and the reference length,
determining, by the at least one processor and based on output of a temperature sensor, a temperature in the concentration measuring space to acquire a temperature measurement value, and
acquiring, by the at least one processor or the external calculation device, a substituted temperature variation value indicative of a difference between the temperature calculation value and the temperature measurement value, and
determining, based on the substituted temperature variation value acquired under each of the temperature conditions, the calibration information used for associating a temperature of the sampleft gas contained in the concentration measuring space with a temperature compensation value from the at least one processor or the external calculation device.

9. The gas concentration measuring apparatus according to claim 8, wherein:

prior to performing the calibration information acquiring process, a procedure is performed, the procedure comprising:
  measuring, by the at least one processor, a reference propagation time required for the ultrasonic wave to travel through the measurement track when the reference gas is contained in the concentration measuring space having an internal temperature set at a reference temperature; and
  acquiring, by the at least one processor or the external calculation device, a length of the measurement track as the reference length based on the reference propagation time.

* * * * *